United States Patent [19]

Hamatani

[11] Patent Number: 4,497,462
[45] Date of Patent: Feb. 5, 1985

[54] OUTWARD OPENING ELECTRICALLY POWERED PLUG-TYPE CARGO DOOR

[75] Inventor: Tomio Hamatani, Seattle, Wash.
[73] Assignee: The Boeing Company, Seattle, Wash.
[21] Appl. No.: 479,676
[22] Filed: Mar. 28, 1983
[51] Int. Cl.³ ............................................... B64C 1/14
[52] U.S. Cl. ................................... 244/129.5; 49/254
[58] Field of Search ............... 244/118.5, 129.5, 129.1, 244/129.4, DIG. 2; 49/254, 255, 201

[56] References Cited

U.S. PATENT DOCUMENTS 3,751,995  8/1973  Carlson .................................. 49/255
3,904,049  9/1975  Prahst .................................... 49/254

FOREIGN PATENT DOCUMENTS 1551821  9/1979  United Kingdom ............. 244/129.5

Primary Examiner—Trygve M. Blix
Assistant Examiner—Rodney Corl
Attorney, Agent, or Firm—Christensen, O'Connor, Johnson & Kindness

[57] ABSTRACT

An outward opening plug-type cargo door for an aircraft is movable between a closed position in which the door blocks an entry opening into the aircraft and an open position in which the door is spaced from the entry opening. The door hinges are directly driven by irreversible rotary actuators. When the door is positioned adjacent the entry opening, a latch mechanism is operable to move the door between a latched and an unlatched position. In the latched position, the door is secured from outboard movement by a plurality of stop pins spaced about the periphery of the door that are located inboard of a series of stop pads mounted at spaced locations about the periphery of the door opening. When the latch mechanism is operated, the door is lifted to free the stop pins from their location behind the stop pads and permit outboard movement of the door. The movement of the door between the latched and lifted positions is programmed by a guide mechanism comprised of guide channels mounted on first and second edges of the door opening that are cooperably engaged by rollers rotatably mounted on first and second edges of the door. The guide channels have detents formed therein and the guide rollers engage the detents when the door is in the latched position and the pressure within the aircraft is greater than the pressure exterior to the aircraft. The detents resist upward vertical movement of the door to maintain the door securely in the latched position to prevent accidental blowout of the door caused by the pressure differential. A power unit is provided to operate the latch mechanism to move the door between the latched and lifted positions and a second power unit is provided to drive the door between the closed and open position. Sensor switches are positioned about the door and entry opening to sequence application of power to the two power units to open and close and latch and unlatch the door. A primary manual drive mechanism is provided coupled to the latch mechanism and the hinge mechanism to operate the latch mechanism and the hinge mechanism in the case of failure of the power unit. A secondary manual drive system is also provided coupled to the hinge mechanism to open and close the door upon failure of the power unit or the primary manual drive.

14 Claims, 18 Drawing Figures

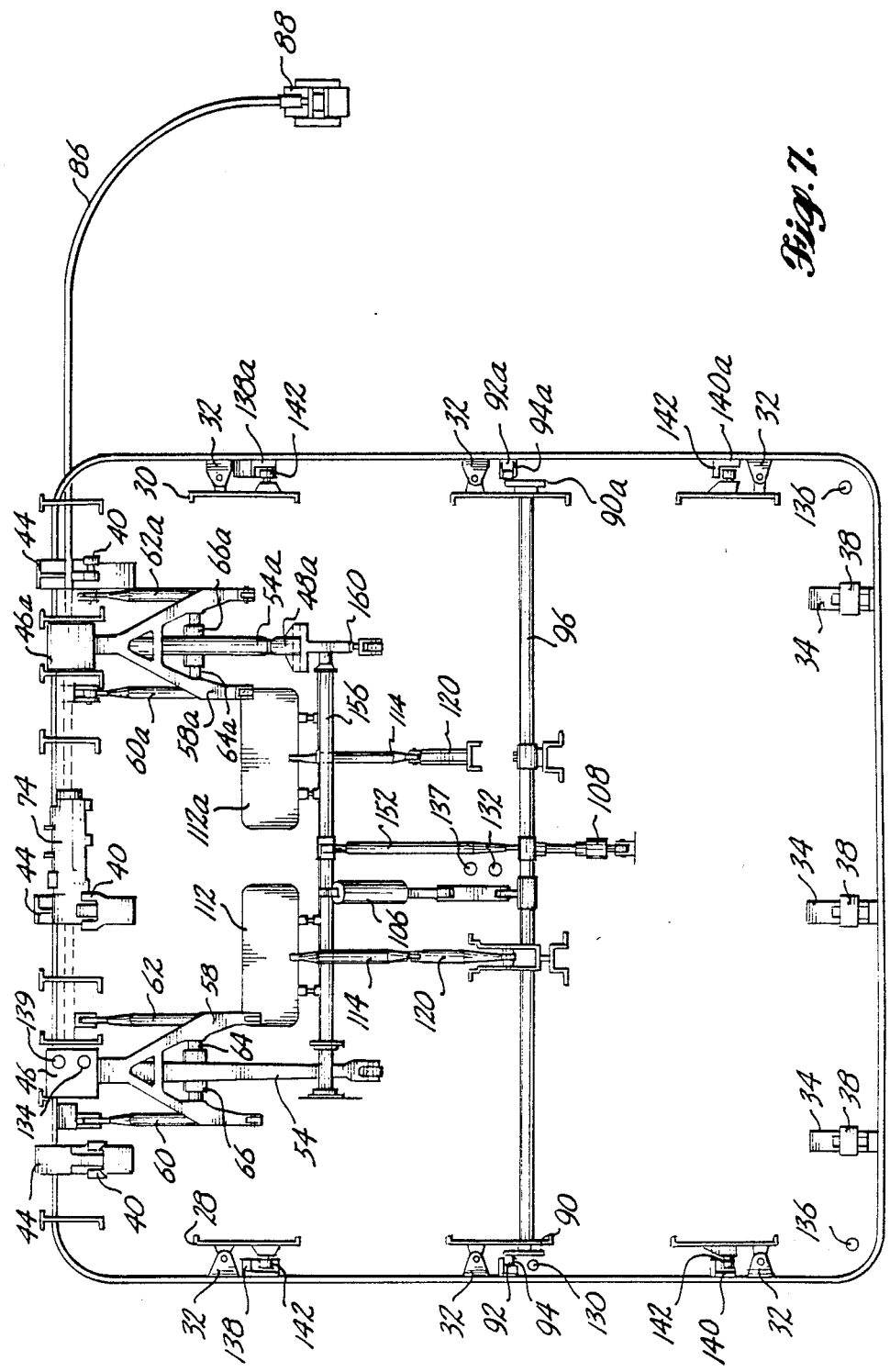

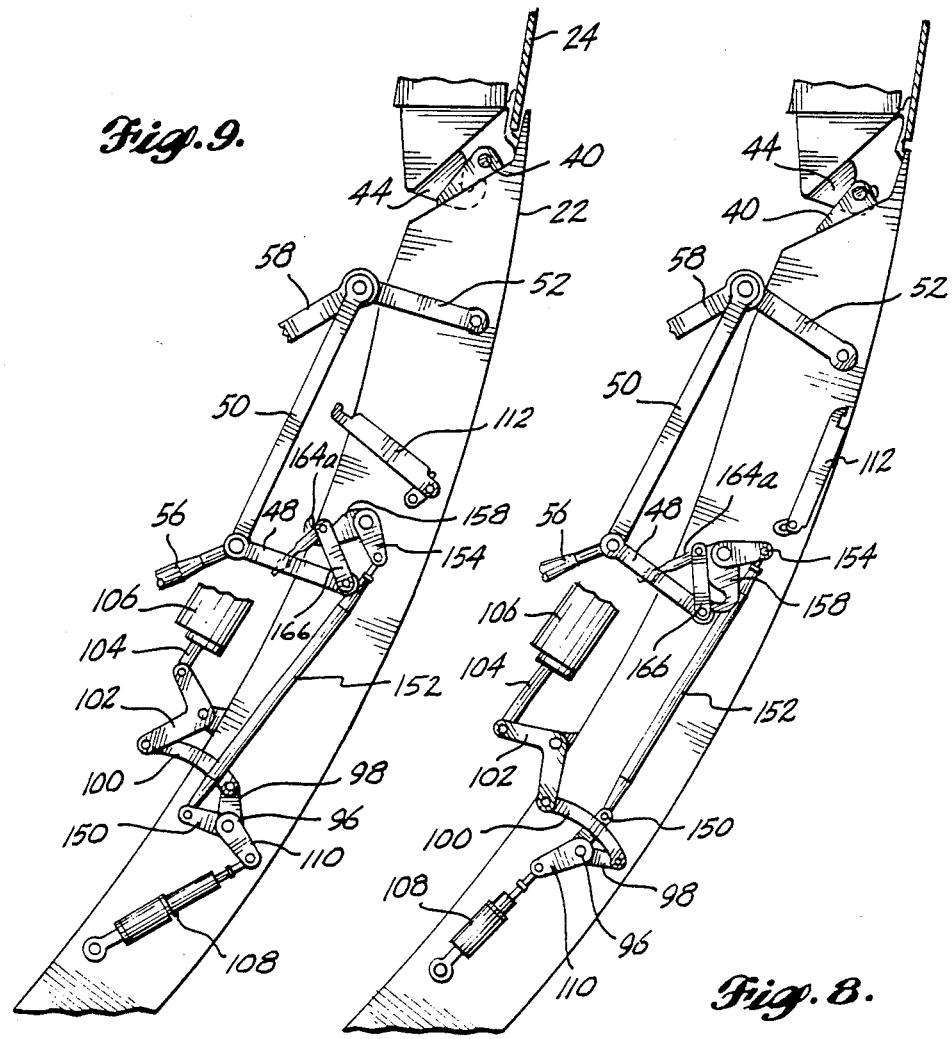

OUTWARD OPENING ELECTRICALLY
POWERED PLUG-TYPE CARGO DOOR

BACKGROUND OF THE INVENTION

This invention relates generally to doors for entry to the cargo areas of transport vehicles, for example, aircraft, and more particularly relates to an electrically powered outwardly opening plug-type cargo door for an aircraft.

Outward opening doors for use in cargo compartments of aircraft are advantageous compared to inward opening doors in that they do not occupy space in the cargo compartment that could otherwise be used for cargo. Plug-type doors for aircraft are advantageous over nonplug-type doors in that an adequate level of safety can be achieved with greater simplicity of mechanism by a plug-type door to prevent the blow-out or accidental opening of the door when the interior cargo compartment pressure is greater than the exterior ambient air pressure, for example, when the aircraft is in flight.

Previous outwardly opening plug-type cargo doors have been spring-counterbalanced and manually operated from the ground. In many of these prior art doors, a strut is used to prop the door open while cargo is being loaded and unloaded. The strut propping the door open prevents the door from inadvertently closing due to wind gusts or other external factors that would overcome the counterbalancing of the door.

SUMMARY OF THE INVENTION

The present invention provides an outward opening plug-type door particularly for use in covering the opening into a cargo bay of an aircraft. In a first, closed position, the door blocks a door opening formed in the body of the aircraft leading into the cargo area. The door is movable to a second position in which the door is spaced from the door opening in a canopy orientation above and outboard of the cargo bay opening. The door is hingedly attached to the body structure by hinges that are directly driven by irreversible rotary actuators such that the weight of the door cannot backdrive the actuators. The door must, therefore, be powered to both the opened and closed positions, thereby eliminating the necessity for a strut to prop the door open when cargo is being loaded and unloaded. The door hinge mechanism is attached directly to the rotary actuators and is constructed and arranged to move the door linearly outboard as it swings into its open canopy orientation. Preferably, a primary manual backup is provided for the power-driven rotary actuators in case of power failure. Further, a secondary manual backup system is preferably provided to permit the opening of the door in the event of complete failure of the power unit.

The door of the present invention is a plug-type door and is secured into the cutout opening so that it cannot be blown out of the opening by a pressure differential between the interior and exterior of the aircraft. Prior to being swung into its canopy orientation, the door must be unplugged by moving it upwardly a predetermined distance to free it from the plug stops and permit it to be swung into its open position. A mechanism for latching and unlatching the door is provided that lifts the door during the unlatching sequence to unplug the door and permit outboard swinging movement. The lifting and latching mechanism is powered and sensor switches are placed at spaced locations about the door and frame to sense the position of the door and to apply and remove power to the lift-latch mechanism and the hinge mechanism in the proper sequence to operate the door. Upon pressurization of the interior of the aircraft, the door is forced outboard against the door stops. Guide tracks are mounted on the door frame that guide the motion of the door between its latched and unlatched lifted position. The primary feature to latch and lock the door is provided by an over center latch crank system; however, the guide tracks of the present invention have detents formed therein that prevent vertical motion of the door when the door is latched and the interior of the aircraft is pressurized. Since the vertical motion of the door is restrained when the door is pressurized accidental vertical movement of the door that could free it from behind the doorstops is prevented. Thus, the plugged configuration of the door is maintained.

BRIEF DESCRIPTION OF THE DRAWINGS

FIG. 7 is a front elevational view of the door of FIG. 2 showing the latching mechanism and hinge mechanism;

FIG. 8 is a side elevational view of a portion of the door of the present invention showing the latching and unlatching mechanism in the latched position;

FIG. 9 is a side elevational view of the latching and unlatching mechanism of FIG. 8 in the unlatched and lifted position;

DETAILED DESCRIPTION OF THE PREFERRED EMBODIMENT

Figure 1:
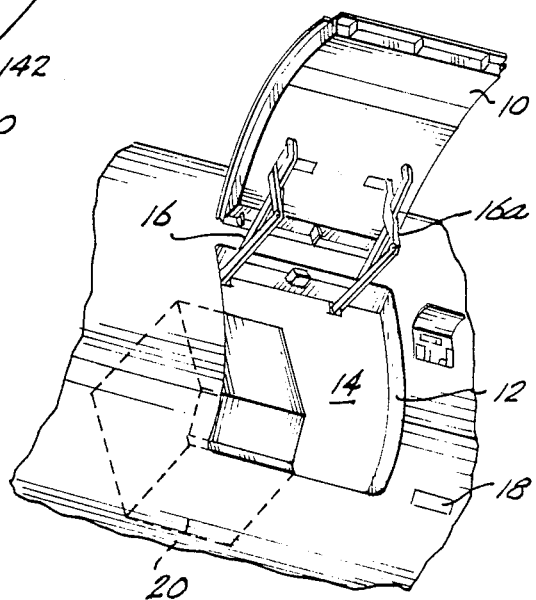
FIG. 1 is an isometric view of a portion of the fuselage of an aircraft having a cargo bay and utilizing a door made in accordance with the principles of the present invention in an open position.

One embodiment of a door 10 adapted for use in connection with the entry opening to the cargo compartment of a commercial airliner, e.g., the Boeing 767, and made in accordance with the principles of the present invention is pictured in FIG. 1. The door 10 is shown in the open, position spaced from a cutout 12 in the aircraft body that serves as the entry to a cargo hold 14. The door 10 is held in a canopy orientation by hinge means 16 and 16a attached at a first end to the door and at a second end to the upper sill of the body cutout.

A control panel 18 is positioned on the exterior of the plane below and forward of the cutout 12 and can be reached from the ground without a ladder. The control panel 18 contains the controls for operating the door mechanism to open and close the door 10 to facilitate the loading and unloading of cargo, such as container 20.

Figure 2:
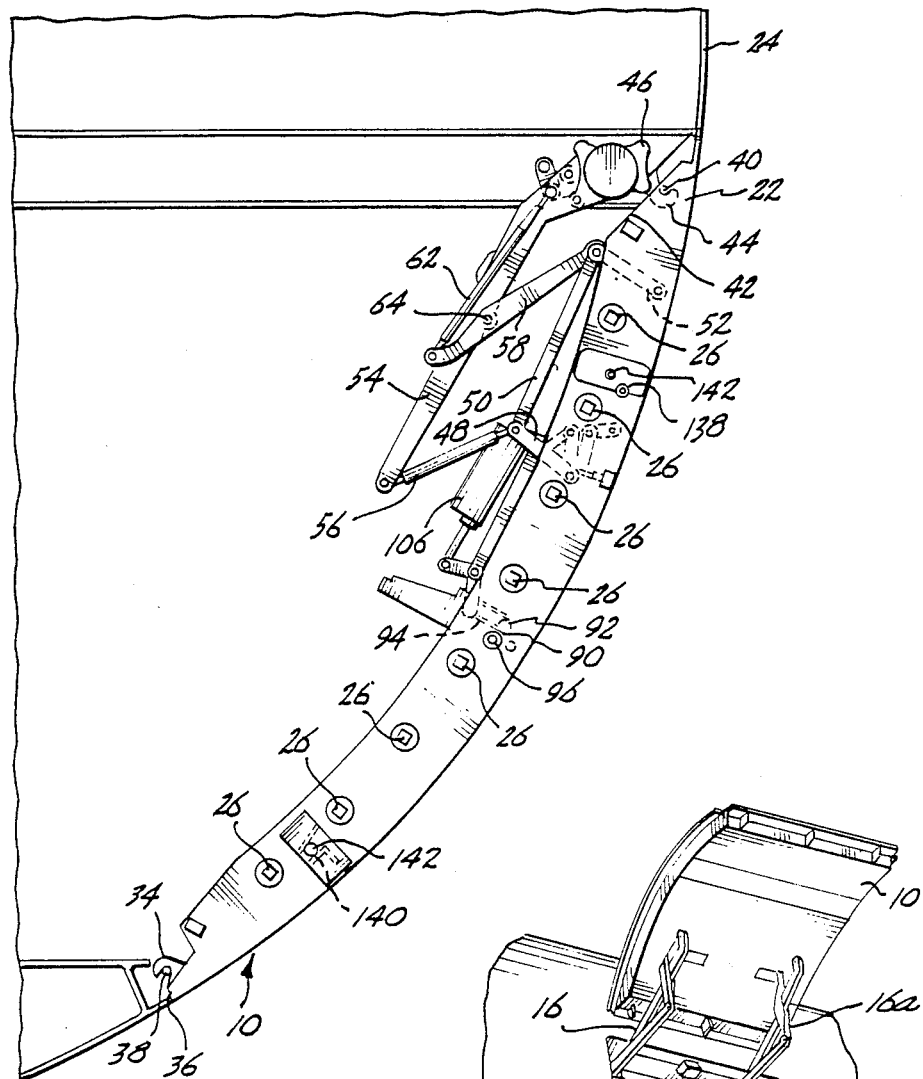
FIG. 2 is a side elevational view of a door made in accordance with the principles of the present invention in the closed and latched position.

In FIG. 2, the door 10 is shown in side elevational view in the closed and latched position within the body cutout 12. In its closed and latched condition, the outer skin 22 of the door 10 is flush with the exterior skin 24 of the aircraft surrounding the body cutout to provide smooth aerodynamic surfaces. In the latched condition, the door 10 is held from outboard movement by a plurality of stop pins 26 fixedly mounted at spaced locations along first and second edges 28 and 30 of the door. The stop pins are inboard of and coact with stop pads 32 mounted on the forward and aft edges of the body cutout 12. Three lower hook stops 34 are fixed to a bottom edge 36 of the door. The hook stops 34 are spaced along the bottom edge 36 and coact with lower clevises 38 affixed to the lower sill of the body cutout 12 in cooperative locations such that the lower hook stops 34 engage the lower clevises 38 when the door 10 is in the latched condition in the body cutout.

Three upper clevises 40 are mounted on the upper edge 42 of the door 10 at spaced locations. The upper clevises cooperate with three upper hook stops 44 fixedly mounted to the upper sill of the body cutout 12 to assist in holding the door in the latched position. The lower hook stops 34 are C-shaped hooks with the open end of the C facing approximately downwardly, while the upper hook stops 44 are C-shaped hooks but have their openings directed upwardly. In order for the door to move to its open position spaced from the body cutout to permit entry to the cargo area, it is necessary to first lift the door 10 upwardly and slightly inboard to move the stop pins 26 from their positions behind the stop pads 32 and to release the upper hook stops 44 and lower hook stops 34 from engagement with the upper clevises 40 and lower clevises 38, thereby permitting swinging motion of the door outboard. The door just described is a plug-type door, meaning that because of the location of the stop pads and hooks, the door cannot be moved outboard when it is in the latched condition and is therefore resistant to being blown out of its closed position by a pressure differential between the interior of the cargo area 14 and the exterior of the aircraft such as is encountered during flight.

Figure 3:
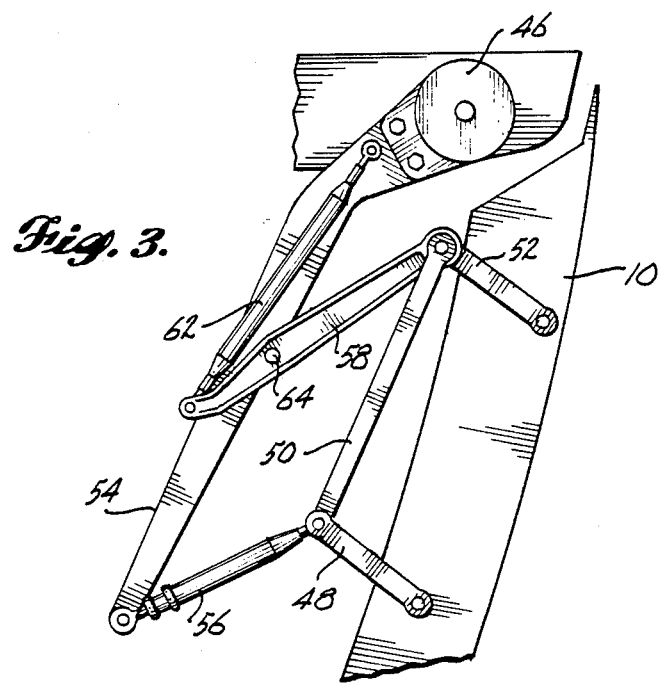
FIG. 3 is a side elevational view of the hinge linkage made in accordance with the principles of the present invention with the door in the unlatched and lifted position.
Figure 4:
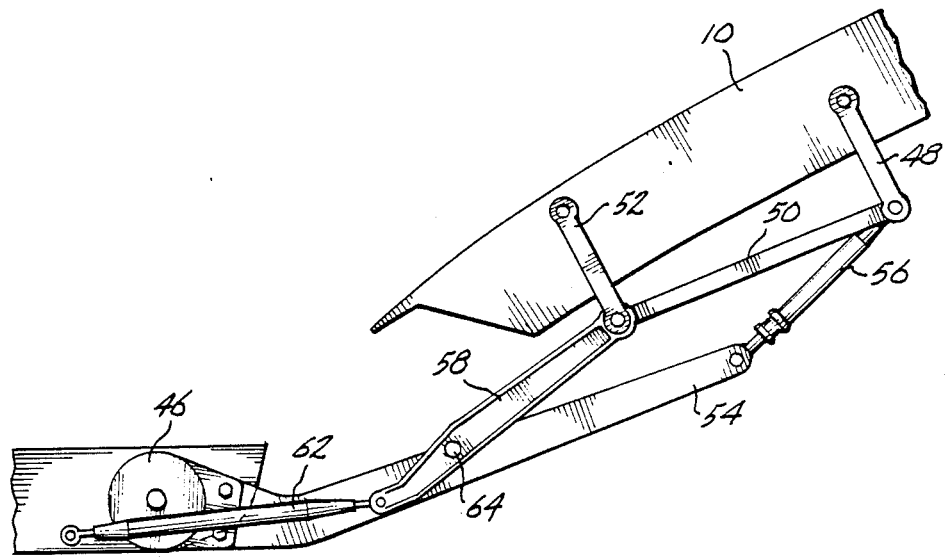
FIG. 4 is a side elevational view of the hinge linkage of FIG. 3 with the door in the fully open position.
Figure 5:
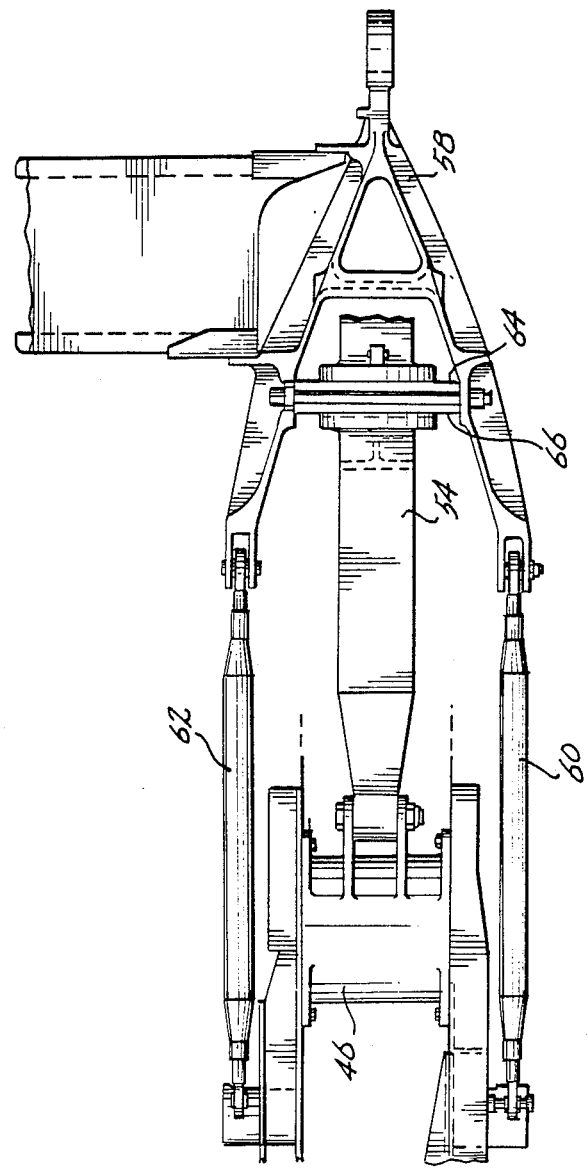
FIG. 5 is a plan view of a portion of one embodiment of a hinge mechanism made in accordance with the present invention with the door in the open position.

After the door is unlatched and lifted to unplug the door it is clear to swing to the open position. The hinge means 16 is illustrated in FIGS. 3 and 4. The door 10 articulates about a first rotary actuator 46 that is mounted adjacent the upper sill of the door cutout. The door 10 is attached through a hinge linkage directly to the rotary actuator 46. In FIG. 3 the door is shown in its unlatched and lifted position and as can be seen, a lower lift link 48 is hingedly attached at a first end thereof to the door 10. A second end of the lower lift link 48 is hingedly attached to a first end of an inextensible hinge link 50. A second end of the hinge link 50 is pivotally attached to a second end of an upper lift link 52 and a first end of the upper lift link 52 is pivotally attached to the door 10 at a point spaced upwardly from the lower lift link 48. The upper and lower lift links 52 and 48 are maintained in substantially parallel relation to one another by the inextensible hinge link 50. A hinge arm 54 is rigidly mounted to the first rotary actuator 46 so that the hinge arm 54 moves in direct proportion to the rotation of the rotary actuator 46. The hinge arm 54 is connected to the lower lift link 48 by an adjustable rod 56 that is pivotally attached at a first end thereof to a second end of the hinge arm 54 in distal relation to the first rotary actuator 46. A second end of the adjustable rod 56 is attached to the common connection point between the lower lift link 48 and the hinge link 50. A connection between the hinge arm 54 and the upper lift link 52 is made by means of a scissors arm 58 that is shown in plan view in FIG. 5. In FIG. 5 the door is in the open position corresponding to the door position shown in FIG. 4. The scissors arm 58 is substantially Y-shaped with the stem of the Y being pivotally attached at a first end thereof to the hinge link 50 and upper lift link 52 at their common point of attachment. The forks of the Y that form the scissors arm are affixed at their distal ends to the first ends of programming rods 60 and 62. The programming rods 60 and 62 are in turn pivotally attached at their respective second ends to the aircraft structure on either side of the first rotary actuator 46. The scissors arm 58 is pivotally connected to the hinge arm 54 by means of a pin 64 that passes through the prongs of the forked portion of the scissors arm at about the midpoint of the prongs. The pin 64 passes through a bushing 66 mounted in an aperture formed in the hinge arm. The scissors arm 58, hinge arm 54, adjustable rod 56, and hinge link 50 form substantially a parallelogram, in side view with the altitude of the parallelogram varying as the door moves from its closed to its open position but with the parallel geometry being maintained throughout the door motion. The program rods 60 and 62 assist in developing the motion of the door as it swings from its closed to its open position such that the door moves laterally outboard as it swings upwardly to its open canopy position so that the door will clear the body skin of the aircraft. The second hinge means 16a is configured identically to the first hinge means 16 and is associated with a second rotary actuator 46a mounted on the door 10 spaced from the first hinge means such that there are symmetric points of attachment of the door to the aircraft structure.

Figure 6:
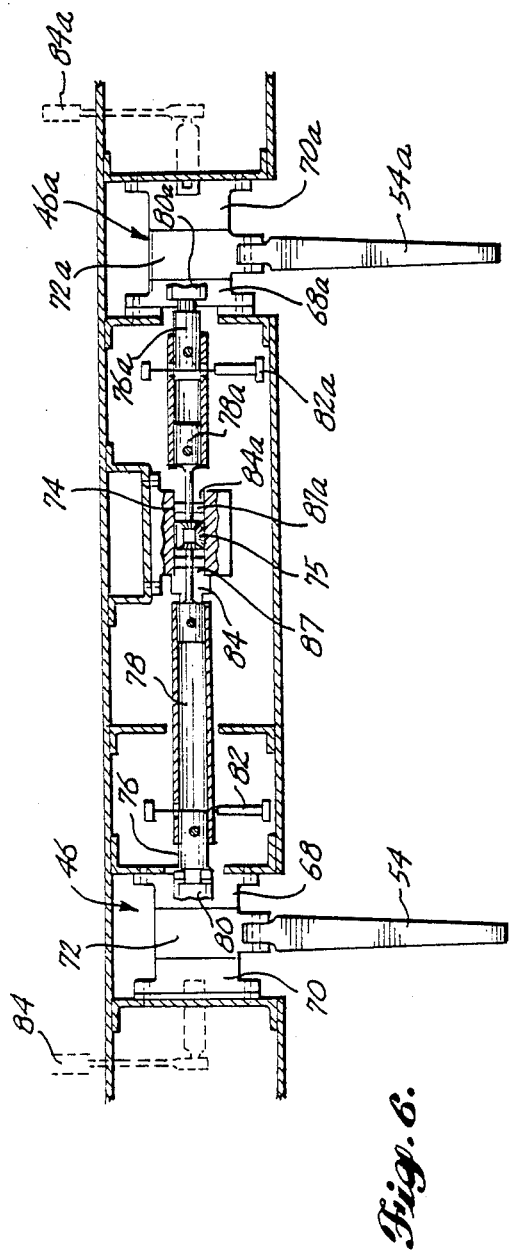
FIG. 6 is a front elevational view of the hinge drive mechanism made in accordance with the principles of the present invention.

The rotary actuators 46 and 46a are preferably electrically powered and are of the nonreversing type, meaning that the actuator must be powered in both the clockwise and counterclockwise direction so that weight of the door in the open position will not backdrive the actuator. The actuator therefore must be powered in the reverse direction in order to move the door from its open to its closed position, thereby preventing inadvertent slippage of the door to the closed position with the potential of injury to cargo handlers and maintenance people working about the open door. As can be seen in FIG. 6, the first rotary actuator 46 comprises three separate components: a right side component 68, a left side component 70, and a center component 72. Typically, the rotary actuator is mounted by fixedly attaching the right and left members to the aircraft structure. The center member 72 then rotates upon the application of driving force to the actuator. The hinge arm 54 is fixedly attached to the center component 72 of the rotary actuator 46 so that the hinge arm swings in direct proportion to rotation of the center component 72. The rotary actuator 46 is driven by a power unit 74 mounted substantially centrally on the upper sill of the body cutout and drivingly coupled to the rotary actuator. The power unit 74 includes a bevel gear differential 75 coupled to the rotary actuators. The differential ensures that equal drive torque is applied to the two rotary actuators so that the door raises and lowers evenly. A first drive shaft member 76 is drivingly coupled at a first end to a drive coupling 80 that is in turn drivingly coupled to the center component of the rotary actuator 46. The second end of the first drive shaft member 76 fits within a hollow portion of the first end of second drive shaft member 78 and is held in place by a drive shaft bolt 82. The second end of the second drive shaft member 78 is coupled to a first output shaft 84 of the differential 75 such that the power unit 74 drives the drive shaft members through the differential. The second rotary actuator 46a associated with the second hinge means 16a and hinge arm 54a is similarly mounted to the aircraft structure and has a central rotating portion 72a fixedly attached to the second hinge arm 54a to move the hinge arm in swinging movement about the rotary actuator axis. The second rotary actuator 46a is coupled to a second output shaft 84a of the differential 75 by means of a second two-part drive shaft consisting of drive shaft members 76a and 78a in a like manner as described above. The differential 75 includes friction clutches 87 and 87a to provide equal torque to each rotary actuator.

As can also be seen in FIG. 6, a ratchet wrench 84 is shown inserted into an opening in the left-hand member 70 of the rotary actuator 46. The ratchet wrench utilizes drive coupling 80 and drivingly engages a coupling associated with the movable center component 72 of the rotary actuator and is used in case of a failed power system to allow the door to be opened manually. The use of the ratchet wrench to open the door is a last-resort procedure and a primary manual drive system is also included which will be described in greater detail below. A second ratchet wrench 84a is associated with the second rotary actuator 46a. And it is necessary to use both ratchet wrenches in unison to open the door in the event of power failure, during the ratchet operation of the door each of the drive shaft members 76 and 76a is uncoupled from its associated drive shaft member 78 and 78a by removal of the respective drive shaft bolts 82 and 82a. The rotary actuators are thus uncoupled from the power unit 74. The ratchet wrenches 84 and 84a are then engaged with the rotary actuators and cranked to drive the central portions 72 and 72a of the respective rotary actuators through a gear reduction, thereby moving the door to the open position.

The primary auxiliary drive means is pictured somewhat schematically in FIG. 7. A flexible drive shaft 86 is drivingly coupled at a first end thereof to the power unit 74. The cable runs along the sill of the door and emerges at the outer skin spaced from the body cutout with the second end of the flexible drive shaft 86 mounted to a gearbox 88 mounted on the exterior of the aircraft so that with the door in the closed position it can be accessed by cargo handlers outside the plane. A drill motor or some other powered means can be coupled to the input of the gearbox 88 to drive the flexible drive shaft, which in turn drives the power unit 74 and turns the rotary actuators 46 and 46a thereby opening the door. Reversal of the drive motor coupled to the gearbox 88 will result in rotation of the flexible shaft 86 in the opposite direction which in turn will cause a reversal of rotation of the rotary actuators 46 and 46a causing the door to move from its open to its unlatched and lifted position. The gearbox 88 and drive shaft 86 are the primary means of operating the door in the case of power failure. In the event of a problem with the gearbox 88 or flexible drive shaft 86, then the alternate manual method of opening the door with the ratchet wrenches 84 and 84a as described in the previous paragraph, can be employed.

The movement of the door 10 from its closed and latched position to a lifted position at which it is clear to swing outboard to the open position is further illustrated in FIGS. 8 and 9. In the latched position, the upper edge of the door is in line with the body skin surrounding the door cutout. Also, the upper hook stops 44 are engaged with their associated clevises 40 attached to the upper edge 42 of the door 10. The unlatched and lifted position of the door is shown in FIG. 9. It can be seen that the upper edge of the door has moved upwardly so that it is now spaced from the body skin and the clevises 40 are released from the hook stops 44 so that the door is free to move laterally.

The door of the present invention must move upwardly a sufficient distance to disengage the stop pins 26 mounted on the sides of the door from their position directly inboard of the stop pads 32 mounted on the sides of the body cutout. The upward movement of the door is provided by the interaction of a pair of rotatable latch cranks mounted on the first and second edges of the door with a pair of latch tracks affixed to the door frame. A first latch crank 90 includes a roller 92 engaged in a latch track 94 that is mounted on the first edge of the door frame. The latch crank 90 is in turn affixed to the end of a latch torque tube 96 that extends across the interior of the door. A second latch crank 90a is attached to a second end of the latch torque tube 96. The latch crank 90a has a roller 92a rotatably affixed to one end thereof, and with the door in the closed and latched position the roller engages a second latch track 94a mounted on the second edge of the door frame. The latched position of the door occurs when the latch crank rollers 92 and 92a are 10 degrees over center. When they are in this position any upward movement of the door will drive the latch crank further toward the latched direction. Upward movement will therefore not inadvertently open the door. Stops are provided on the torque tube 96 to limit rotation in the latched and unlatched direction. In order to lift the door sufficiently for the door stop pins to clear the stop pads, the torque tube 96 is rotated, thereby rotating the latch cranks 90 and 90a causing the latch cranks to react against the latch tracks 94 and 94a that are affixed to body structure. The entire door assembly is thereby lifted. Referring now to FIG. 8, which shows a side view of the door in the latched position, the latch torque tube 96 has affixed thereto a bell crank 98, one end of which is attached to a control link 100, which in turn is affixed to a second bell crank 102 attached at a first end thereof to a rod 104 extending from a linear actuator 106. The second end of the linear actuator 106 is affixed to the door structure. When it is desired to open the door, the operator activates the linear actuator 106, which in turn draws the rod 104 into the actuator thereby rotating the crank 102 and moving the link 100. This causes rotation of the torque tube 96, which in turn rotates the latch cranks 90 and 90a. The reaction of the latch cranks against the latch tracks lifts the door. A spring bungee 108 is mounted between the door structure and one end of a crank 110 affixed to the latch torque tube. The spring bungee provides resistance initially against movement of the door to provide a positive latch for the door. Once the door begins to move to the lifted position, the bungee assists in the movement. The bungee also ensures a positive latch of the door upon closing and relatching the door.

Figures 10A, 10B, 10C:
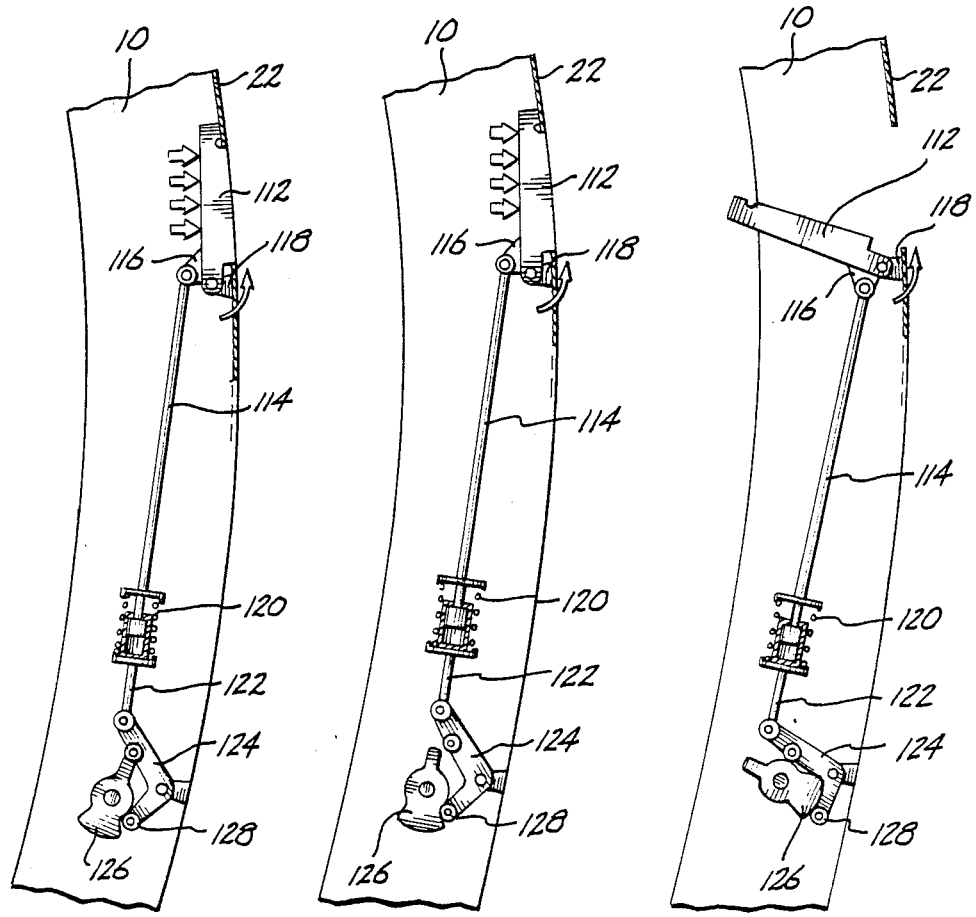
FIG. 10A is a side elevational view of the pressure relief mechanism of the door of FIG. 7 in the door latched position.
FIG. 10B is a side elevational view of the pressure relief mechanism of FIG. 10A with the door in the unlatched position.
FIG. 10C is a side elevational view of the pressure relief mechanism of FIGS. 10A and 10B in the door lifted position.

The door of the present invention has a pressure-relief feature in that it has vents formed in the door 10 to allow the equalization of pressure within and without the aircraft. The pressure-relief vents are covered by vent doors that are in sealed relation over the vent openings and that are opened upon unlatching of the door to equalize pressure prior to opening of the door. Further, the vent doors are coupled to the latch torque tube 96 such that if the pressure within the cargo compartment is greater than exterior pressure the vent doors cannot be opened, thereby preventing the doors from being unlatched and preventing possible blowout of the door by the pressure differential. Referring to FIGS. 10A, 10B and 10C, the pressure vent door-opening sequence is illustrated. In FIG. 10A the vent door 112 is shown in its closed position. A vent door push rod 114 is attached at a first end thereof to a bracket 116 at the base of the vent door 112. The door 112 is hingedly attached to the outer skin of the door by means of a vent door bracket 118. The vent door push rod 114 is connected to a vent door bias spring assembly 120 that biases the vent door into a closed position. The spring assembly is coupled by means of a second vent door push rod 122 to an L-shaped crank 124. The L-shaped crank is pivotally attached to the door at the apex of the L-shaped member. A cam 126 is fixedly attached to the latch torque tube 96 in such a manner that when the vent door 112 is in the closed position the latch torque tube 96 is prevented from complete rotation by the interference of a roller 128 mounted on the L-shaped crank 114 with a tab on the cam 126.

As can be seen in FIG. 10B, if the internal pressure of the cargo compartment exceeds a predetermined amount, the vent door 112 will remain closed and the lift/latch linear actuator 106 will not have enough power to overcome the force on the vent door 112 so that the latch torque tube will not turn and the door 10 will be prevented from lifting to an unlatched position. If the internal pressure is less than a predetermined amount, the cam 126 will be rotated by the rotation of the latch torque tube and will force the L-shaped crank 124 to rotate under the force of the lift/latch linear actuator 106, thereby pulling the vent door push rods 114 and 122 to move the vent door to its open position as pictured in FIG. 10C. Upon latching of the door, the latch torque tube will be rotated to its initial position shown in FIG. 10A and the spring bias assembly 120 will cause the push rod to move the vent door 112 to its closed position and at the same time the L-shaped crank will rotate to its original position as pictured in FIG. 10A. The vent door spring bias assembly 120 also serves to prevent the internal body pressure from being not lower than a prescribed ambient pressure. Higher ambient pressure than body pressure, such as might occur in a rapid descent, will cause the spring bias assembly 120 to compress and allow the vent door to open to equalize pressure.

Since it is necessary in the door opening sequence to first unlatch and lift the door, and then only after the door is in the lifted position, swing it outboard to its open canopy position, it is necessary to synchronize the application of power to the lift/latch linear actuator 106 and the hinge power unit 74. A plurality of proximity sensors are placed at various locations on the door and frame to sense the position of the door and the lift/latch mechanism in order to properly sequence the door opening. When power is first applied to open the door, the power is applied to the lift/latch linear actuator 106 to move the door to its unlatched, lifted position. A proximity sensor 132 notes the movement of the door to the lifted position and another sensor 130 notes the movement of the lift/latch mechanism from the latched to the unlatched state. When the proximity sensor 130 senses that the door is in the lifted, unlatched position, power to the lift/latch linear actuator 106 is cut off and power is transferred to the hinge power unit 74 to power the rotary actuators 46 and 46a to swing the door to its open position. Other proximity sensors 134 are provided to sense when the door has reached the full open position at which time power is cut off from the hinge drive power unit 74. In like manner, when the door is to be closed, power is first applied to the hinge power unit 74 to move the door to its closed position. When proximity sensors 136 note that the door is in the body cutout power is shifted from the hinge power unit 74 to the lift/latch linear actuator 106 to operate the lift/latch actuator and rotate the latch torque tube, thereby rotating the latch cranks 90 and 90a to move the door into its latched position. When the proximity sensors 137 sense that the door is in its latched position power is cut off to the lift/latch linear actuator 106. Proximity sensor 139 senses that the door is in the cutout and proximity sensor 130 senses that the door is latched. These sensors are also used to illuminate indicator lights in the cockpit to alert the crew as to the condition of the door. Typical locations of the various proximity sensors are shown in FIG. 7 and the proximity sensors themselves can be any suitable conventional proximity switch arrangement.

Figure 11:
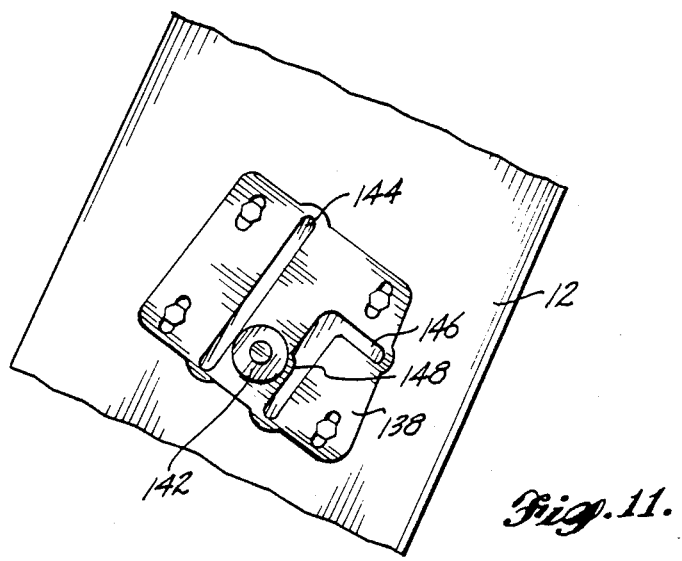
FIG. 11 is a side elevational view of one embodiment of a guide track and roller pair made in accordance with the principles of the present invention.

In order to ensure that the door takes the proper direction upon unlatching and lifting, and again upon reestablishing its position within the body cutout, upper guide tracks 138 and 138a and lower guide tracks 140 and 140a are provided on each side of the body cutout. Guide rollers 142 mounted on the edge of the door 10 are fitted within the guide tracks when the door is in body cutout in the latched position. FIG. 11 illustrates a typical guide track 138 with a typical guide roller 142 lying within the channel formed by a rear guide member 144 and a forward guide member 146. As the door is unlatched, the guide roller 142 moves up the channel formed between the members 144 and 146 and then is enabled to move outboard along the uppermost portion of the guide member 146. Inboard motion is still prevented by the guide member 144 that extends a further distance in the upward direction than the forward guide member 146.

Figure 12:
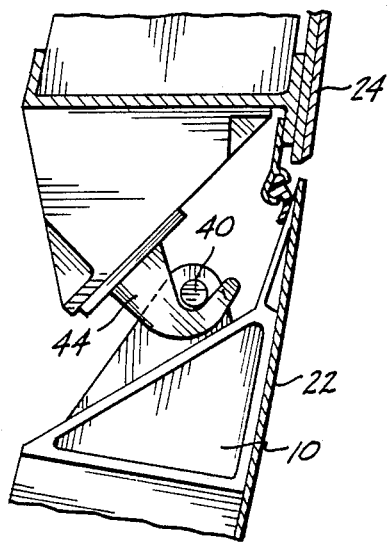
FIG. 12 is a side elevational view of the upper portion of the door of FIG. 2 in the latched position.
Figure 13:
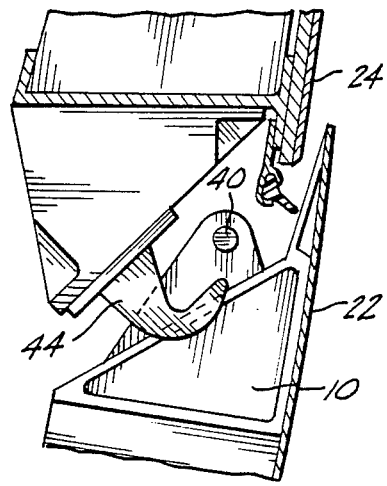
FIG. 13 is a side elevational view of the upper portion of the door of FIG. 2 in the unlatched and lifted position.

Since the plug nature of the door is essentially dependent upon maintenance of the position of the stop pins 26 behind the door stop pads 32, it is critical that the door 10 be kept from vertical movement when in the closed and latched position in order to maintain the plug-type integrity of the door. While the lift/latch linear actuator maintains the door 10 in the latched position through the latching linkage, it is still preferable to have some additional means of preventing vertical movement of the door 10 when the door is latched and the cargo compartment is pressurized. The door of the present invention includes detents formed on the forward members 146 of each of the guide track assemblies 140 as pictured in FIG. 11. The roller 142 remains in approximately the center of the channel formed between members 144 and 146 when the door is in the latched position and the pressures within and without the cargo compartment are essentially equal. However, when the cargo compartment is pressurized, such as during flight, and the exterior pressure is considerably lower, the door 10 will be forced outboard such that the roller 142 will be pressed against the forward member 146 at a point within the detent formed in the member 146. In order for the door to make vertical movement, it is necessary for the roller 142 to overcome the resistance formed by the corner 148 of the detent whereby adding additional restraint against vertical movement. Each of the guide tracks is configured in a similar manner such that the total resistance offered by all four guide tracks is cumulative in providing vertical restraint. As shown in FIGS. 12 and 13 the outboardmost surfaces of the upper hook stops 44 and lower hook stops 34 are similarly detented to provide still more vertical restraint.

Figure 14:
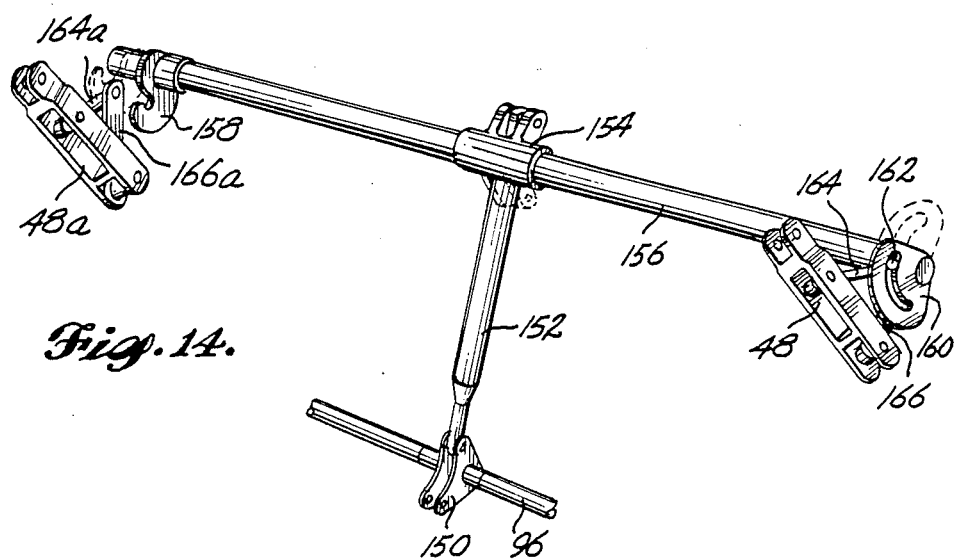
FIG. 14 is an isometric, schematic live of the lockout cam assembly of the door of FIG. 7.
Figure 15:
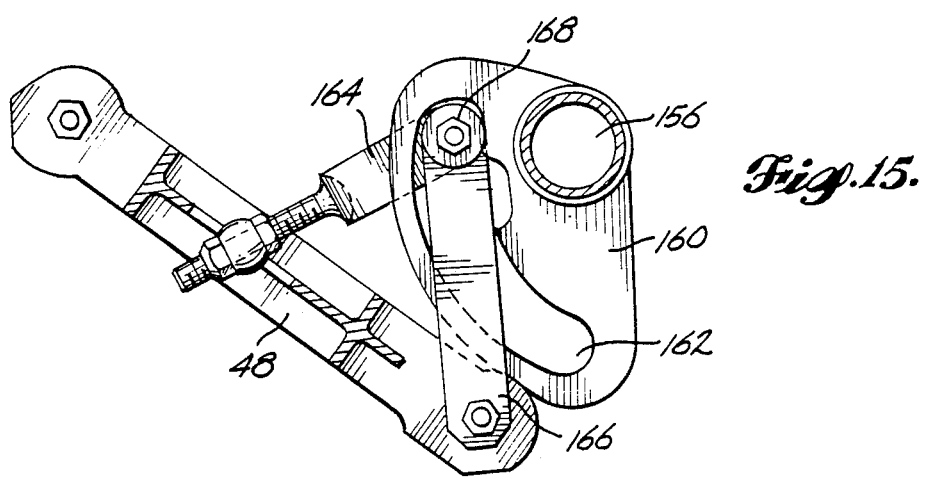
FIG. 15 is a side elevational view of a portion of the lockout/up-stop cam assembly shown in FIG. 14.
Figure 16:
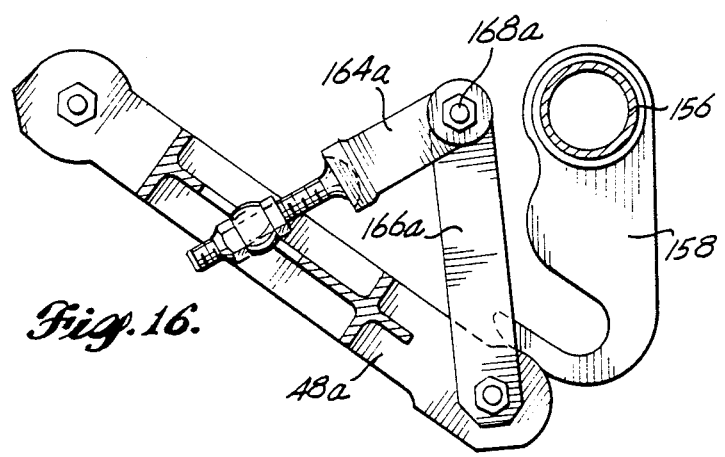
FIG. 16 is a side elevational view of a portion of the lockout cam assembly shown in FIG. 14.

An additional mechanism to stabilize the lift links when the door is in the open position, while at the same time providing additional vertical restraint when the door is in the latched position, is provided by the lockout upstop cam and lockout cam assembly. Referring to FIG. 14, the solid lines show the lockout system in the door latched position. A lockout drive crank 150 is affixed to the latch torque tube 96. A lockout push rod 152 is attached at a first end thereof to the lockout drive crank 150. A second end of the lockout push rod 152 is attached to an upper lockout crank 154 such that rotation of the latch torque tube 96 will cause linear movement of the lockout push rod 152 and rotation of the upper crank 154. The upper lockout crank 154 is fixedly mounted on a lockout torque tube 156 that has affixed to a first end thereof a lockout cam 158 of generally hook shape. The second end of the lockout torque tube 156 has affixed thereon a lockout up-stop cam 160 having a slot 162 formed therein. A clevis 164 is connected to the lower lift link 48a and a roller support member 166 is also affixed to the lower lift link 48a at approximately the point of attachment of the lift link to the door. A clevis roller 168 is rotatably mounted within the clevis 164 and the second end of the roller support member 166 is attached to the clevis forming an acute angle and with the roller at the apex of the angle. The clevis roller 168 is captive within the slot 162 formed in the lockout up-stop cam 160. In the door latched position the roller 168 is located at the uppermost end of the slot 162. The location of the roller within the slot prevents vertical movement upwardly of the door with relation to the hinge linkage. A similar clevis and roller support assembly comprised of clevis 164a and roller suppport member 166a is mounted on the lower lift link 48 in proximity to the lockout cam 158. Upon rotation of the latch torque tube 96, the lockout torque tube 156 is also rotated causing rotation of the lockout cam 158 into engagement with the clevis roller 168a associated with the lower lift link 48. At the same time the clevis roller 168 is now positioned at the lowermost end of the slot 162 formed in the lockout up-stop cam 160. The lockout system, comprised of the lockout cam 158, lockout up-stop cam 160, lockout torque tube 156, and lockout push rod 152, provides stability to the lift links when the door 10 is in the open position and supports the weight of the door through rollers 168 and 168a when the door is out of the cutout. In the open position the door is constrained from moving inboard, that is, toward the body of the aircraft, by engagement of the lockout cam and the lockout up-stop cam with their associated clevis rollers.

While a preferred embodiment of the door of the present invention has been discussed and illustrated, it will be clear to those of ordinary skill in the art and others that changes can be made to the described and illustrated embodiment while remaining within the scope of the present invention. The invention should therefore be defined solely with reference to the appended claims.

The embodiments of the invention in which an exclusive privilege or property is claimed are defined as follows:

1. In an aircraft having an entry opening formed in the body of the aircraft, a door assembly for closing said opening, said door assembly comprising:

a door;
   hinge means associated with said door for pivotally attaching said door to said body for swinging movement of said door between a first position in which said door lies within said opening and a second position in which said door is spaced from said opening, said hinge means being constructed and arranged to move an upper edge of said door outboard from said body as said door moves from said first position to said second position;
   hinge drive means coupled in driving relationship to said hinge means for driving said door between said first and second positions;
   latch means operable when said door is in said first position to place said door in a latched position in which movement of said door to said second position is prevented;
   latch drive means drivingly coupled to said latch means to operate said latch means;
   hinge power means coupled to said hinge drive means for providing power to said hinge drive means;
   latch power means coupled to said latch drive means for providing power to said latch drive means;
   a plurality of sensor switch means spaced about said door and associated with said hinge power means and said latch power means to sense the position of said door to control the application of power from each of said hinge power means and latch power means to said hinge drive means and latch drive means in response to the sensed position of said door.

2. The door assembly of claim 1, further including:
   door stop pins spaced about the periphery of said door;
   door stop pads spaced about the periphery of said entry opening and cooperably associated with said stop pins when said door is in said latched position to prevent outboard movement of said door, said latch means operable to lift said door from said latched position to a lifted position wherein said stop pins are freed from engagement with said stop pads, thereby allowing outboard movement of said door.

3. The door assembly of claim 2 wherein at least one of said sensor switch means is located in such position that it senses the lifting movement of said door by said latch means, said at least one sensor switch means removing power from said latch drive upon sensing said lifting movement and providing power to said hinge drive unit.

4. The door assembly of claim 3 further including:
guide channel means mounted on a first and second edge of said entry opening;
guide rollers rotatably mounted on a first and second edge of said door, said guide rollers cooperably engaging said guide channels so as to program the motion of said door between said latched and lifted positions, said guide channels further including detent means engageable by said rollers when the pressure inside said aircraft is greater than the pressure outside said aircraft, said detent means resisting upward movement of said door when engaged by said rollers.

5. The door assembly of claim 1 further including primary manual power means associated with said latch drive means and said hinge drive means and manually operable to power said hinge drive means and latch drive means.

6. The door assembly of claim 5 further including secondary manual drive means coupled to said hinge drive means and manually operable to drive said hinge drive means.

7. The door assembly of claim 4 further including pressure-relief means associated with said door, said pressure-relief means operable upon operation of said latch means to equalize the pressure within said aircraft with the pressure outside said aircraft and further operable when the pressure inside said aircraft is greater than the pressure outside said aircraft to prevent the operation of said latch means so as to maintain said door in said latched position.

8. The door assembly of claim 7 wherein said pressure-relief means includes:

pressure-relief openings formed in said door;
pressure-relief doors pivotally mounted on said doors associated with said pressure-relief openings to close said openings when said door is in said latched position and pressure-relief linkage means coupling said pressure-relief doors to said latch means said pressure-relief linkage means operable when said latch means moves said door from latched position to said unlatched position to move said pressure-relief doors away from said pressure-relief openings.

9. The door assembly of claim 1 wherein said hinge means includes a finish hinge linkage means coupled at a first end thereof to said door and coupled at a second end thereof directly to said hinge drive means.

10. The door assembly of claim 9 wherein said hinge drive means comprises a nonreversible rotary actuator.

11. The door assembly of claim 4 wherein said latch means further includes:
a latch track affixed to the periphery of said opening;
a latch crank cooperably engaged with said latch track when said door is in said latched position;
latch linkage coupling said latch power means to said latch crank, said latch crank being rotatable to move said door from said latched to said unlatched position.

12. The door assembly of claim 8 wherein said pressure relief linkage means includes a spring bungee operable when the pressure outside said aircraft is greater than the pressure inside said aircraft by a predetermined amount to permit the pressure relief doors to open to equalize the pressure without affecting the latched condition of said door.

13. The door assembly of claim 10 further including a second hinge linkage means coupled at a first end thereof to said door at a location spaced from said first hinge linkage means and coupled at a second end thereof directly to said hinge drive means.

14. The door assembly of claim 13 wherein said hinge drive means includes first and second rotary actuators respectively coupled to said first and second hinge linkage means and wherein further said rotary actuators are coupled to said hinge power means through a clutched differential such that equal torque is applied by said hinge power means to each of said first and second hinge linkage means.

* * * * *